(12) United States Patent
Yokota

(10) Patent No.: US 6,771,189 B2
(45) Date of Patent: Aug. 3, 2004

(54) DISPLAY METHOD AND APPARATUS FOR NAVIGATION SYSTEM

(75) Inventor: Tatsuo Yokota, Torrance, CA (US)

(73) Assignee: Alpine Electronics, Inc., Tokyo (JP)

(*) Notice: Subject to any disclaimer, the term of this patent is extended or adjusted under 35 U.S.C. 154(b) by 0 days.

(21) Appl. No.: 10/196,840

(22) Filed: Jul. 17, 2002

(65) Prior Publication Data

US 2004/0012505 A1 Jan. 22, 2004

(51) Int. Cl.⁷ .............................................. G08G 1/123
(52) U.S. Cl. ................ 340/990; 340/995.1; 340/995.2; 340/995.27; 701/208; 701/211
(58) Field of Search ................................. 701/208, 211, 701/209, 210; 340/990, 995.1, 995.11, 995.14, 995.15, 995.17, 995.2, 995.27

(56) References Cited

U.S. PATENT DOCUMENTS

| | | | | |
|---|---|---|---|---|
| 5,452,212 A | * | 9/1995 | Yokoyama et al. | 701/211 |
| 5,638,279 A | * | 6/1997 | Kishi et al. | 701/200 |
| 5,739,772 A | | 4/1998 | Nanba et al. | |
| 5,874,905 A | * | 2/1999 | Nanba et al. | 340/995.2 |
| 6,119,066 A | | 9/2000 | Sugiura et al. | |
| 6,121,900 A | | 9/2000 | Takishita | |
| 6,178,380 B1 | | 1/2001 | Millington | |
| 6,240,361 B1 | | 5/2001 | Ise et al. | |
| 6,405,131 B1 | * | 6/2002 | Barton | 701/211 |
| 6,611,753 B1 | * | 8/2003 | Millington | 701/209 |
| 6,614,363 B1 | * | 9/2003 | Behr et al. | 340/988 |

* cited by examiner

Primary Examiner—Nina Tong
(74) Attorney, Agent, or Firm—Muramatsu & Associates

(57) ABSTRACT

A display method and apparatus for navigation system for displaying a guidance map showing appropriate number of upcoming and subsequent turns on the route to the destination with an appropriate and enlarged display size. The guidance map includes a highlighted route indicating the directions of turns. The navigation system applies various test conditions to the geometry of the streets to determine the number of turns to be displayed. Then, the navigation system enlarges the guidance map so that the map covers the area that can show the adjusted number of turns and the streets at the maximum size.

22 Claims, 11 Drawing Sheets

Category List

| Recreation | Input Category |
|---|---|
| Bank | Hotel |
| Emergency | Gas Station |
| Restaurant | Shopping |
| Travel | Automotive |
| Park | Theater |

DISPLAY METHOD AND APPARATUS FOR NAVIGATION SYSTEM

FIELD OF THE INVENTION

This invention relates to a display method and apparatus for navigation system, and more particularly, to a display method and apparatus for a navigation system which is capable of displaying a guidance map showing appropriate number of upcoming and subsequent turns on the route to the destination with an appropriate display size.

BACKGROUND OF THE INVENTION

A vehicle navigation system performs vehicle travel guidance for enabling a driver to easily drive the vehicle to a selected destination. Typically, a navigation system displays a direction of the next turn in a highlighted route format on the guidance map. This invention is directed to a display method and apparatus for displaying directions of turns when there are two or more turns in succession within a short distance on the route to the destination.

First, basic technology of a navigation system is briefly described here. Such a navigation system detects the position of the vehicle, reads out map data pertaining to an area at the vehicle current position from a data storage medium, for example, a CD-ROM (compact disk read-only memory) or a DVD (digital versatile disc), and displays a map image on a monitor screen (display) while superimposing a mark representing the current location of the vehicle on the map image.

The vehicle position is determined by a self-contained navigation sensors (e.g. Ea distance traveled sensor and a bearing sensor) mounted in the vehicle or by a global positioning system (GPS) including an artificial satellite (satellite navigation). The satellite enables absolute position detection and higher position accuracy than the self-contained navigation sensors. However, the satellite navigation involves problem of position detection failure such as in a tunnel or a building where the satellite radio signals are obstructed. Therefore, recent navigation systems utilize both self-contained navigation and satellite navigation to achieve improved performances.

As the present position of the vehicle changes with the travel of the vehicle, the vehicle current position mark in the map image on the screen is changed accordingly. Alternatively, the map is scrolled while the vehicle current position mark is fixed at a predetermined position, for example, at the center of the image. In either method, the navigation system enables the driver to recognize the map information of the area at the vehicle position at a glance.

When a destination is not set, such a navigation system functions as a locator map which indicates the current location of the vehicle on a map image. When the destination is set, the navigation system starts a route guidance function for setting a guided route from the starting point to the destination. Typically, the route guidance function performs an intersection guidance process in which a monitor screen displays an enlarged intersection diagram and the direction in which the vehicle is to travel while displaying the guide route on a map. When a destination is input, a CPU in the navigation system determines a most suitable guided route from the current vehicle position to the destination and successively stores nodes (expressed in longitude and latitude) constituting the guided route in a memory.

During actual traveling, the node series stored in the memory is searched for a portion of the guided route to be displayed in a map display area of the monitor screen, and the portion of the guided route is highlighted so as to be discriminable from other routes. When the vehicle is within a predetermined distance of an intersection it is approaching, an intersection guidance diagram (an enlarged or highlighted intersection diagram with an arrow indicating the direction in which the vehicle is to turn at the intersection) is displayed to inform a driver of the desired one of roads or directions selectable at the intersection.

Figure 1A:
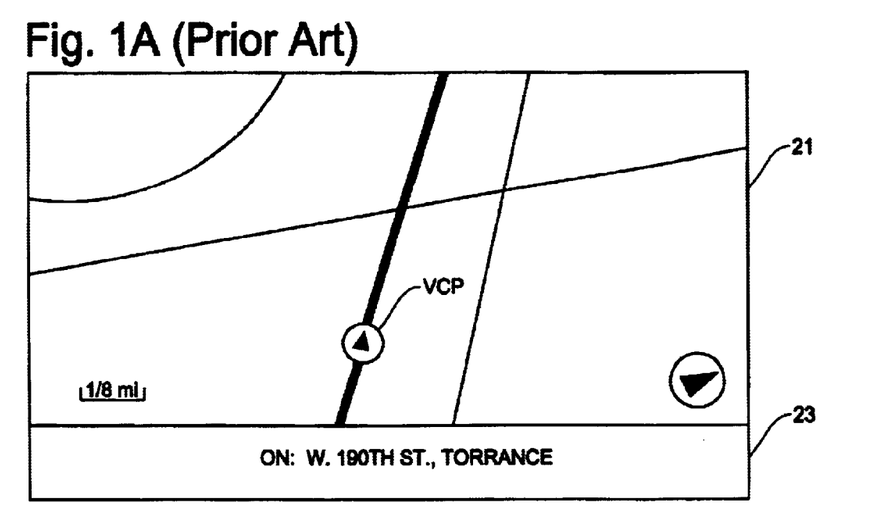
FIGS. 1A and 1B are schematic diagrams showing an example of locator map display and route guidance display, respectively, of a navigation system.

FIG. 1A shows an example of a locator map display containing a vehicle current position mark VCP on a map image 21. Typically, a navigation system shows the street on which the vehicle is running in the map image 21 and a name of the street such as "W 190TH ST" in an information box 23 on the monitor screen. Other information such as a north pointer NP, a map scale and a current time may also be illustrated on the display screen. In this manner, the locator map display shows the current position of the vehicle on the map image, however, it does not perform the route guidance function because the destination is not set in the navigation system.

Figure 1B:
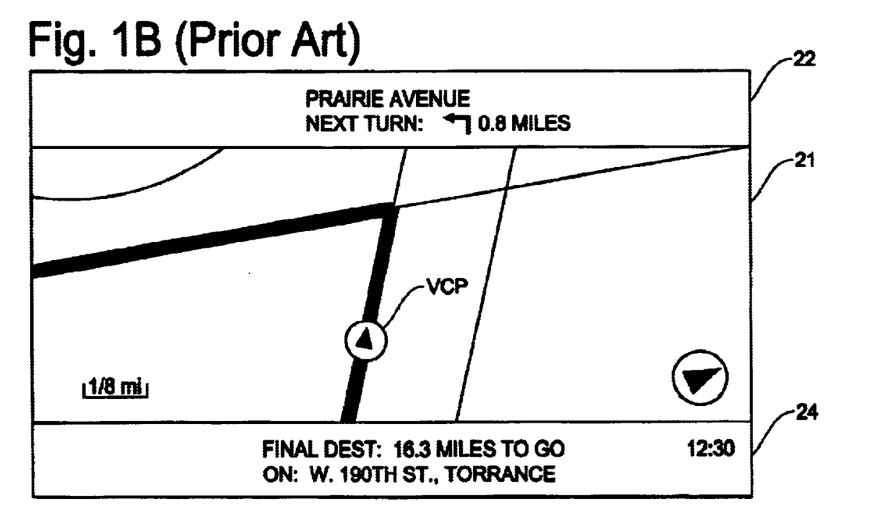

FIG. 1B shows an example of route guidance display which performs the route guidance function. The route guidance display is activated after specifying the destination. In addition to the map image 21 similar to the locator map of FIG. 1A, this example further shows an arrow indicating the direction (left) in which the vehicle is to turn at the intersection in a guidance information box 22 at the top of the screen. The guidance information box 22 also shows a name of the street "PRAIRIE AVE" which intersects with the current street "W 190TH ST" and a distance to the intersection. Thus, the navigation system indicates that the vehicle should make a left turn at the intersection with "PRAIRIE AVE".

Typically, the current street "W 190TH ST" and the left side of the street "PRAIRIE AVE" will be highlighted in the map image 21. Further, such route guidance is accompanied by voice instructions. If the direction of travel in the next intersection is left, the navigation system gives spoken guidance such as "turn left at the next intersection". In this example, an information box 24 at the bottom of the display screen includes information regarding the remaining distance to the final destination and an estimated time to reach the final destination.

In order to be guided by the route guidance mode such as shown in FIG. 1B, a destination must be specified in the navigation system so that the system can find one or more routes to get to the destination. FIGS. 2A–2F show examples of display shown on the monitor screen during the operation of inputting the destination.

Figure 2A:
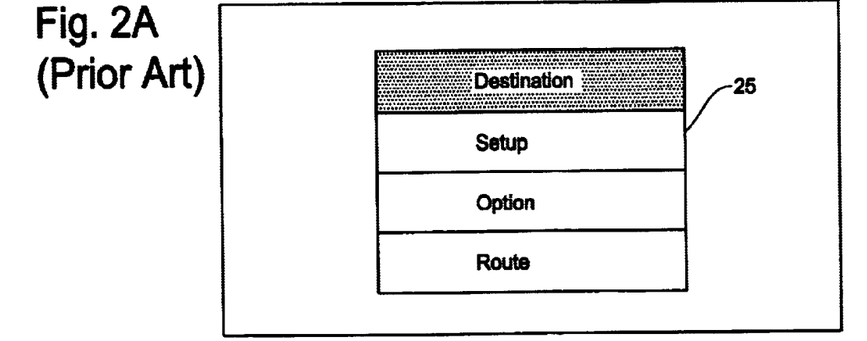
FIG. 2A is a main menu.
Figure 2B:
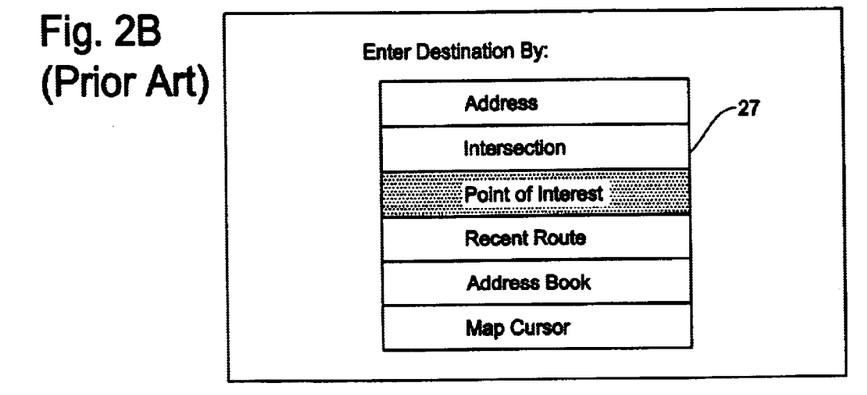
FIG. 2B is a destination set menu.

By operating a menu key, a main menu 25 such as shown in FIG. 2A is displayed on the navigation system and a menu item "Destination" is selected from the main menu. This allows the navigation system to display a "Enter Destination by" menu 27 as shown in FIG. 2B for specifying an input method for selecting the destination. The "Enter Destination by" menu 27 lists various methods for selecting the destination including "Address" for specifying the city and address of the destination, "Intersection" for specifying the names of two streets in the city which intersect with one another, and "Point of Interest" for selecting the programmed destination based on the name, category or telephone number.

Other methods in the "Enter Destination by" menu 27 include "Recent Route" for specifying the destination based on the recent destinations saved in the navigation system, "Address Book" for selecting the address of the destination out of the addresses stored in the system, and "Map Cursor" for specifying the destination by pointing a cursor to the destination on the map. For example, the information in the address book is formed of a list of names and addresses of the places that the driver frequently visits.

Figure 2C:
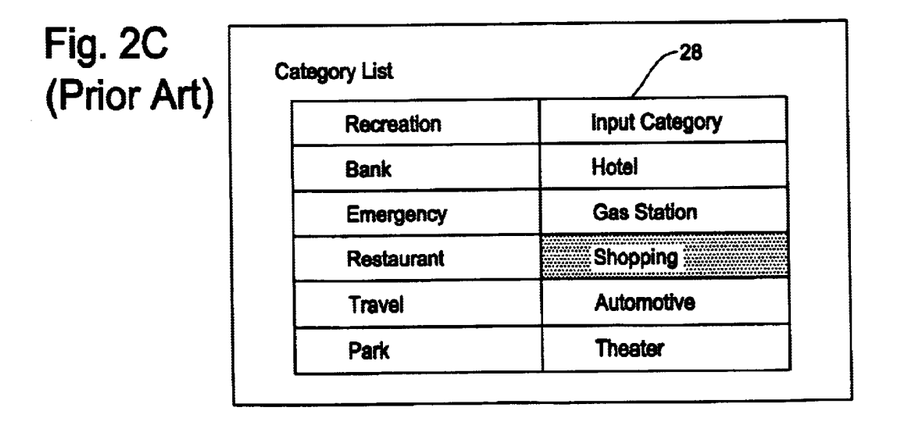
FIG. 2C shows a list of categories when setting a point of interest.
Figure 2D:
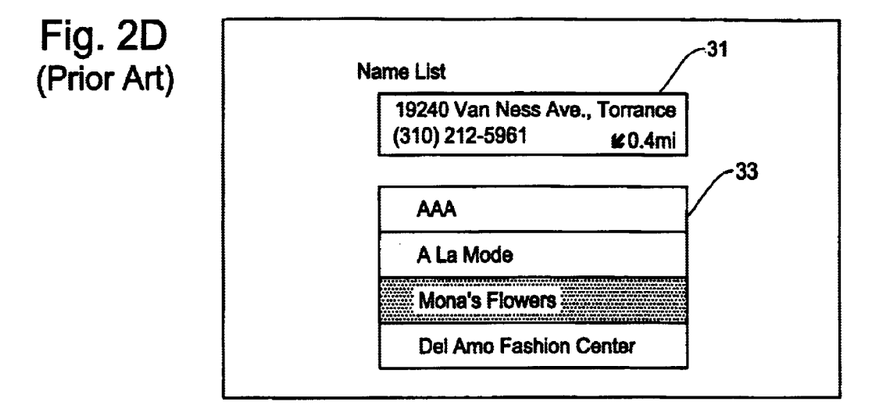
FIGS. 2D and 2E show name list in the category specified in FIG. 2C.
Figure 2E:
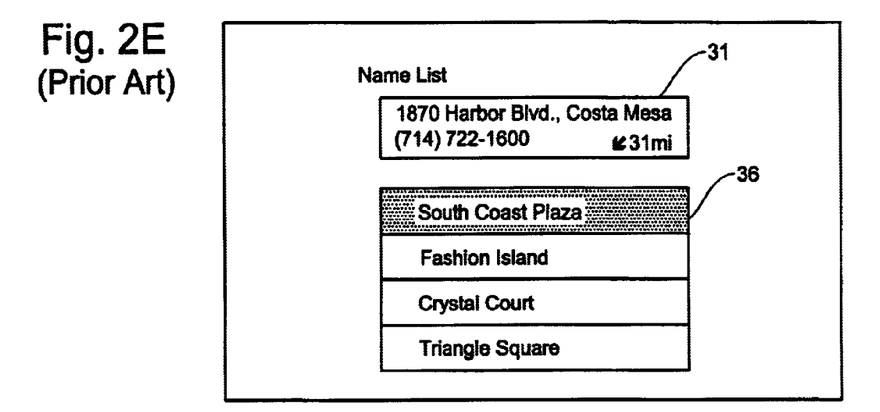
Figure 2F:
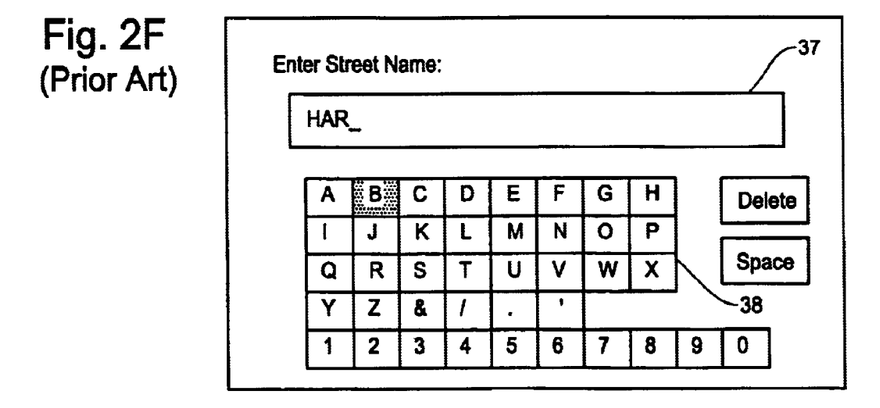
FIG. 2F shows a key board display for entering the street name of address or intersection.

When selecting, for example, the "Point of Interest" in FIG. 2B, the navigation system displays a "Category List" menu 28 such as shown in FIG. 2C. The "Category List" menu 28 contains various different categories such as "Bank", "Restaurant", "Hotel", "Shopping" and others. Supposing the category "Shopping" is selected, the navigation system displays "Name List" such as shown in FIGS. 2D and 2E. The "Name List" shows names of shops and shopping malls sorted by, for example, distance from the vehicle. In an address information box 31 on the display, the address and phone number of the highlighted name in the list 33 will be displayed. The address information box 31 may also show the distance to the highlighted shop. Typically, the navigation system stores several tens or hundreds of names of shops within predetermined distances and displays several shops per page of display screen, and a user may scroll the display screen to see other names of shops in the name list 36 such as shown in FIG. 2E.

When the destination is not prestored in the navigation system, a user can input the destination by selecting, for example, the "Address" method or "Intersection" method in the "Enter Destination by" menu 27 of FIG. 2B. Then, the navigation system displays an "Enter Street Name" shown in FIG. 2F for inputting the city and address in an address input box 37 by means of a key board (keypad) 38 displayed on the monitor screen.

After inputting the destination, the navigation system determines a route to the destination based on, for example, the shortest way to reach the destination, the route preferring freeways to surface roads or the route without using toll road, and the like. Thus, the navigation system moves to the route guidance display such as shown in FIG. 1B which performs the route guidance.

In the route guidance, the direction of next turn is illustrated by arrow (arrow guidance) or highlighted route (map guidance) as shown in FIG. 1B. Such route guidance by the navigation system is also given by voice instruction. When there is a second turn relatively close to the first turn, the navigation system shows the first and second turns on the display depending on predetermined conditions.

Figure 3A:
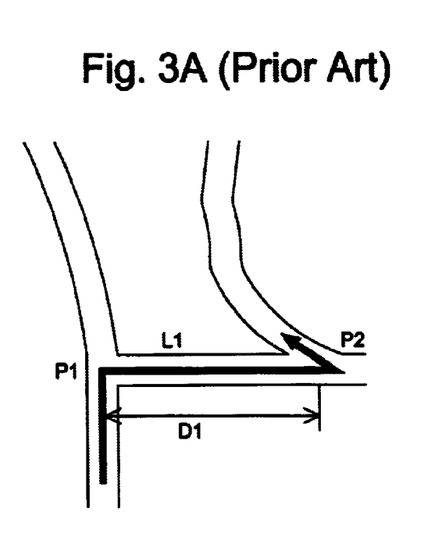
FIGS. 3A–3B are schematic diagrams showing an example of route conditions and associated arrow guidance screen displaying the turning directions in the conventional vehicle navigation system.
Figure 3B:
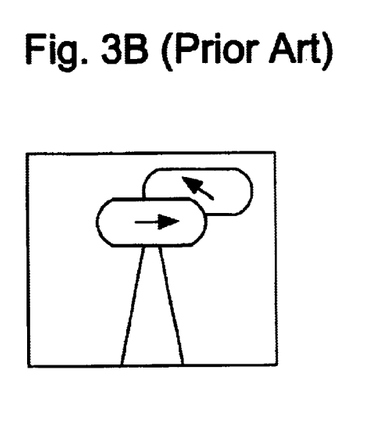
Figure 4A:
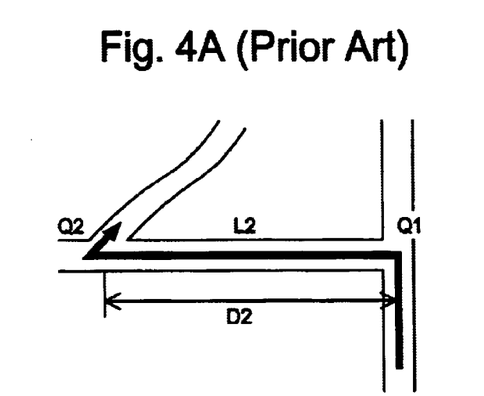
FIGS. 4A–4B are schematic diagrams showing another example of route conditions and associated arrow guidance screen displaying the turning direction in the conventional vehicle navigation system.
Figure 4B:
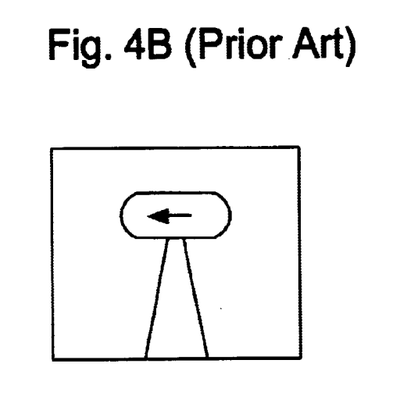

Such an example of displaying the first turn or both of the first and second turns is shown in FIGS. 3A–3B and 4A–4B. This conventional technology is disclosed in the U.S. Pat. No. 5,739,772 which is directed to the arrow guidance. FIGS. 3A and 3B show a case where the distance D1 between the first turn P1 and the second turn P2 is smaller than a predetermined amount. In contrast, FIGS. 4A and 4B show a case where the distance D2 between the first turn Q1 and the second turn Q2 is larger than the predetermined amount.

When the second turn is near the first turn, as in the case of FIG. 3A, the navigation system detects that the distance between the first turn P1 and the second turn P2 is smaller than the predetermined amount. Then the navigation system displays two arrows respectively indicating the directions of the first turn P1 and the second turns P2 on the screen in a partially overlapped manner in FIG. 3B.

When the second turn is away from the first turn, as in the case of FIG. 4A, the navigation system detects that the distance between the first turn P1 and the second turn P2 is larger than the predetermined amount. Then the navigation system displays only one arrow indicating the direction of the first turn P1.

In this conventional technology, only one or two arrows will be displayed on the screen. Thus, it is not possible to provide a driver sufficient information or a route image regarding the subsequent turns, such as how soon the subsequent turn comes or whether there is a further turn immediately after the subsequent turn, etc. Therefore, there is a need in the navigation system to illustrate an optimum number of turns on the guidance map with an optimum size of the map so that the driver is able to grasp the upcoming turns and succeeding turns at a glance.

SUMMARY OF THE INVENTION

It is, therefore, an object of the present invention to provide a display method and apparatus for navigation system which enables a user to easily and quickly grasp the turn maneuvers and directions in the map guidance mode with optimum window sizing.

The navigation system is designed to enable a user to quickly observe the two or more turn maneuvers on the map image to fully prepare for the turns coming in succession. The navigation system applies various test conditions and determines optimum number of turns to be displayed and enlarges the guidance map by removing the unnecessary turns from displaying on the screen. Not all of the test conditions may necessarily be used but various combinations of test conditions can be advantageously used in the navigation system.

More specifically, the method of the present invention includes steps of: displaying a guidance map for guiding a user to a destination by indicating a maneuver point on the route and a direction of turn at the maneuver point; detecting a plurality of maneuver points in succession on the route to the destination and applying at least one test condition to the maneuver points based on geometry of the maneuver points; adjusting a number of maneuver points to be displayed on the guidance map; and enlarging a size of the guidance map while including the adjusted number of maneuver points in the guidance map.

The step of enlarging the guidance map includes a step of maximizing the size of the guidance map while sufficiently including all of the adjusted number of maneuver points. The step of adjusting the number of maneuver points includes a step of including a maneuver point which forms a street shorter than a predetermined length defined by the test condition in the guidance map and a step of removing a maneuver point which forms a street longer than the predetermined length defined by the test condition from the guidance map.

The test condition includes a test condition (1) which determines $L_{(n,\ n+1)} \leq L_{max}$, where $L_{(n,\ n+1)}$ is a drive length along a street between two adjacent maneuver points $P_n$ and $P_{n+1}$, and $L_{max}$ is a maximum allowable drive length of the a street between the two adjacent maneuver points.

The test condition includes a test condition (2) which determines $L_{(n,\ n+1)} \leq K_D D_{(1,\ 2)}$, where $L_{(n,\ n+1)}$ is a drive length along a street between two adjacent maneuver points $P_n$ and $P_{n+1}$, $D_{(1,\ 2)}$ is a straight-line length between a first maneuver point $P_1$ and a second maneuver point $P_2$, and $K_D$ is a relative factor for determining maximum allowable straight-line maneuvers. This test condition can be modified to $D_{(n,\ n+1)} \leq K_{DD} D_{(1,\ 2)}$, where $K_{DD}$ is a relative factor equivalent to $K_D$ above but is applicable to the straight-line length between points $P_n$ and $P_{n+1}$ instead of the drive length between the two maneuver points.

The test condition includes a test condition (3) which determines $L_{(n, n+1)} \leq K_{LD} D_{(n, n+1)}$, where $L_{(n, n+1)}$ is a drive length along the street between two adjacent maneuver points $P_n$ and $P_{n+1}$, $D_{(n, n+1)}$ is a straight-line length between the two adjacent maneuver points $P_n$ and $P_{n+1}$, and $K_{LD}$ is a relative factor for determining a maximum drive length with respect to the straight-line distance.

The test condition includes a test condition (4) which determines $D_{(1, n+1)} \leq D_{max}$, where $D_{(1, n+1)}$ is a straight-line distance between a first maneuver point $P_1$ and a farthest maneuver point $P_{n+1}$, and $D_{max}$ is a maximum allowable distance between the first maneuver point $P_1$ and farthest maneuver point $P_{n+1}$. Further, the test condition includes a test condition (5) which determines $m \leq M_{max}$, where m is a number of maneuvers in succession, and $M_{max}$ is a maximum allowable number of maneuver points that can simultaneously appear on guidance map.

Another aspect of the present invention is a display apparatus for a vehicle navigation system. The display apparatus is configured by various means for achieving the display methods described above which applies the various test conditions to the series of turns on the route to the destination and adjusts the number of maneuver points and produces the enlarged guidance map.

According to the present invention, the vehicle navigation system enables the user to easily grasp the consecutive turns and their directions on the route to the destination. The driver can check and grasp the maneuver points at a glance and fully prepare for the next turn such as by changing lanes. Accordingly, the driver can travel to the destination comfortably and with confidence.

BRIEF DESCRIPTION OF THE DRAWINGS

FIGS. 2A–2F are schematic diagrams showing display examples of a navigation system.

DETAILED DESCRIPTION OF THE INVENTION

Figure 13:
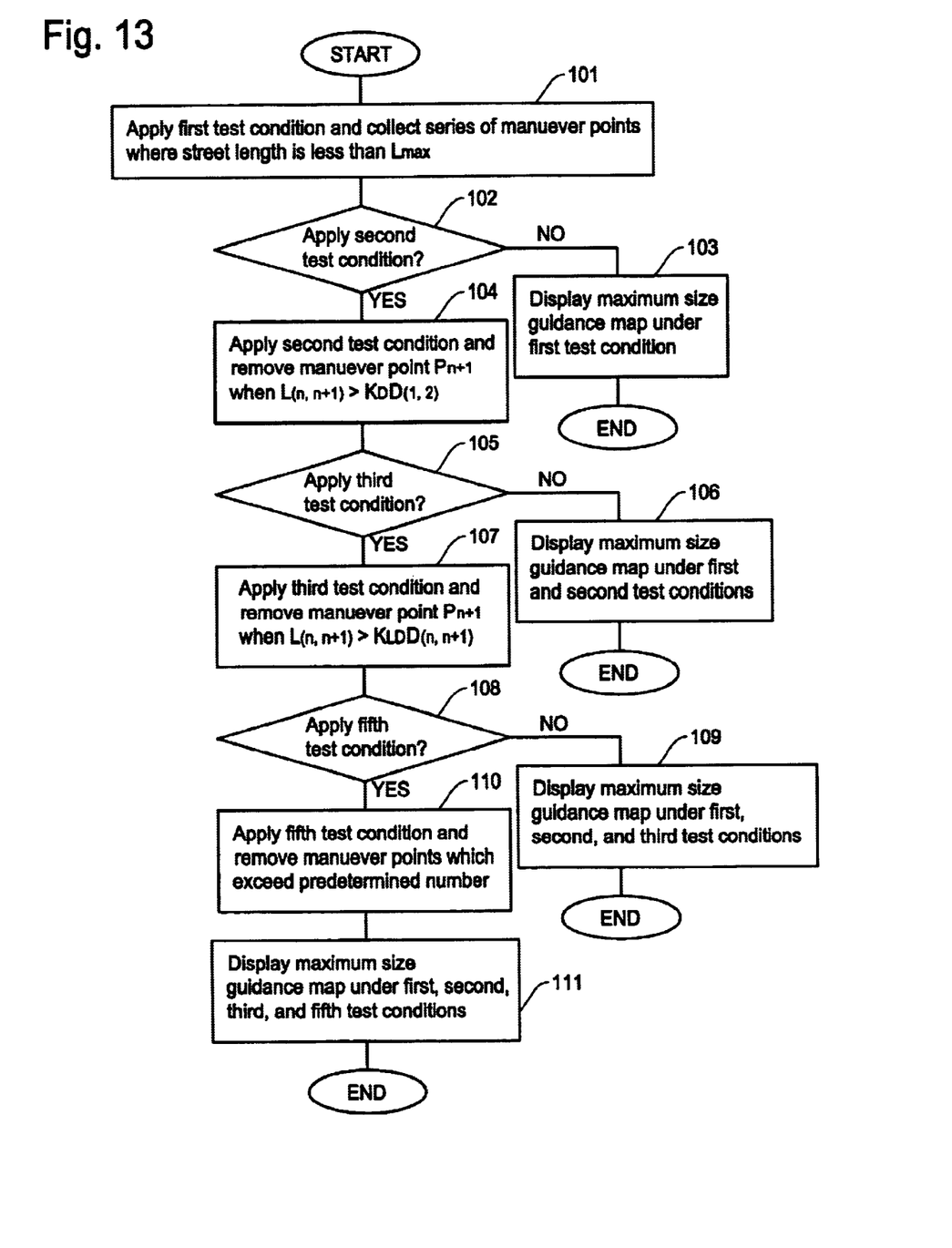
FIG. 13 is a flow chart showing an example of operational process in the navigation system of the present invention.
Figure 14:
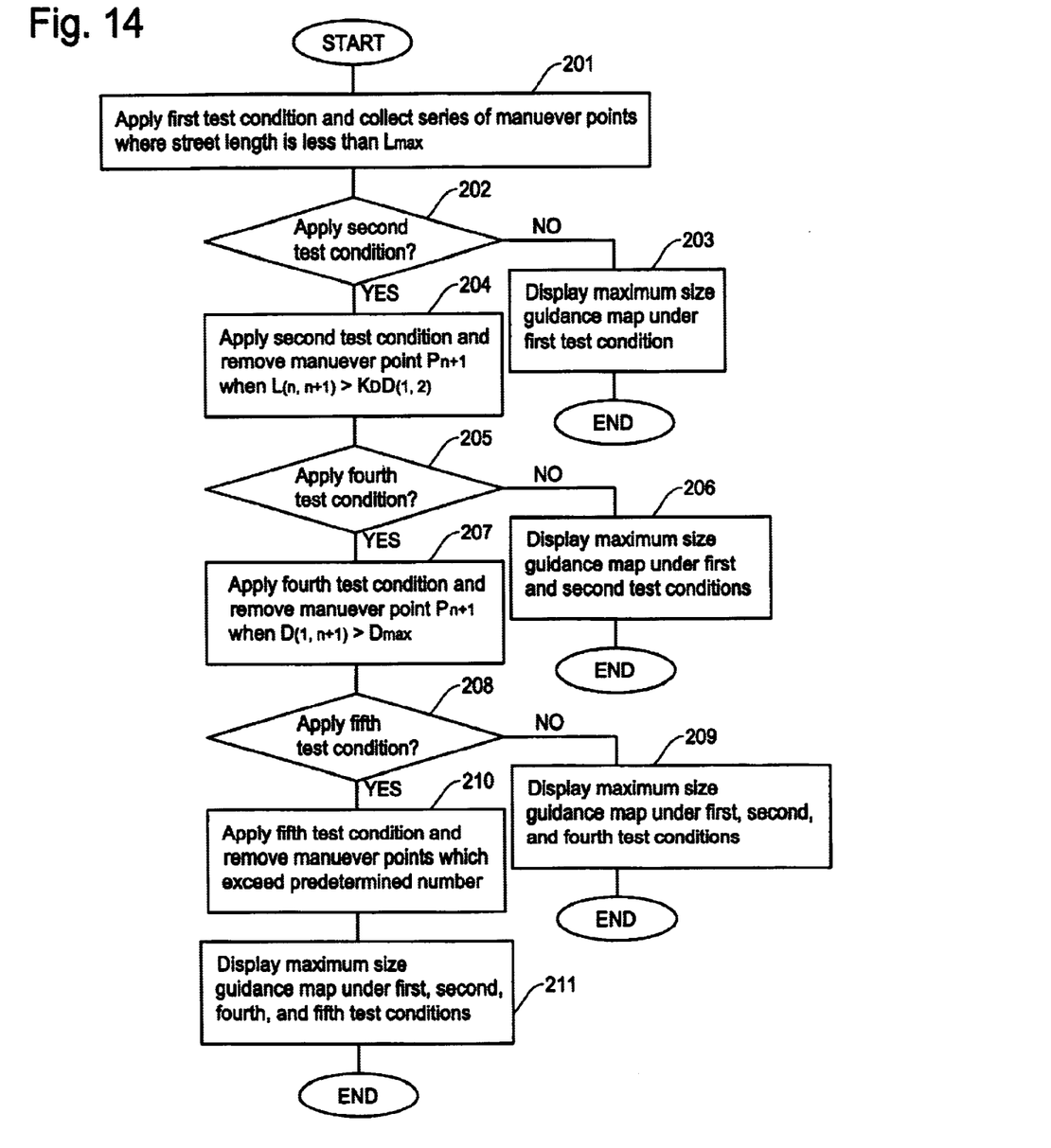
FIG. 14 is another flow chart showing another example of operational process in the navigation system of the present invention.

The navigation system of the present invention will be described in detail below with reference to the accompanying drawings. The navigation system of the present invention is designed to display an optimum number of turns (maneuver points) with an optimum size of the guidance map to enable a user quickly and easily grasp the intersections and turn directions. Examples of operation process and display screen in the present invention are shown in FIGS. 7–12 in which various test conditions are used to determine the optimum display for particular street geometry and layout. FIGS. 13 and 14 show operational flows in the navigation system of the present invention.

When there are two or more turns (turning maneuvers or maneuver points) on the route to the destination, within a predetermined distance, the navigation system displays a simplified map image and directions of such turns to guide the driver. In accordance with the present invention, the navigation system applies various test conditions to the turning maneuvers and adjusts the number of maneuver points that appear simultaneously on the map guidance screen. It should be noted that the order of application of the test conditions is insignificant. The navigation system displays an enlarged map image including the highlighted route with directions of adjusted number of maneuver points.

Before going into details of the test conditions and display examples of FIGS. 7–12, a brief description will be made regarding the basic structure of the navigation system of the present invention with reference to FIG. 5 and an example of remote controller for the navigation system with reference to FIGS. 6A and 6B.

Figure 5:
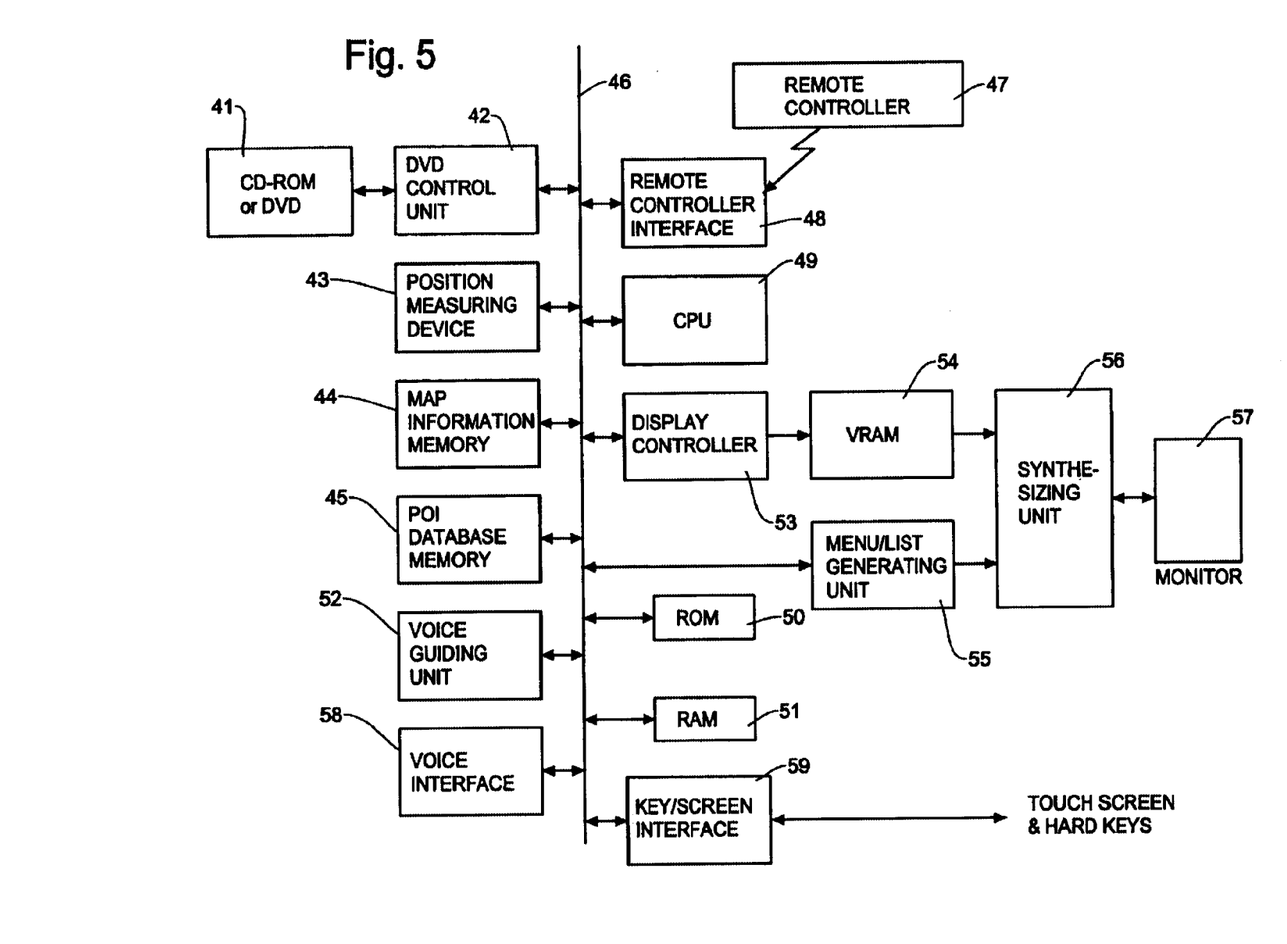
FIG. 5 is a block diagram showing an example of structure in the vehicle navigation system according to the present invention.

In the block diagram of FIG. 5, the navigation system includes a map storage medium 41 such as a CD-ROM, DVD, hard disc or other storage means (hereafter "DVD") for storing map information, a DVD control unit 42 for controlling an operation for reading the map information from the DVD, a position measuring device 43 for measuring the present vehicle position. The position measuring device 43 has a vehicle speed sensor for detecting a moving distance, a gyroscope for detecting a moving direction, a microprocessor for calculating a position, a GPS receiver, and etc.

The block diagram of FIG. 5 further includes a map information memory 44 for storing the map information which is read out from the DVD 41, a database memory 45 for storing database information such as point of interest (POI) information which is read out from the DVD 41, a remote controller 47 for executing a menu selection operation, an enlarge/reduce operation, a destination input operation, etc. and a remote controller interface 48.

Figure 6A:
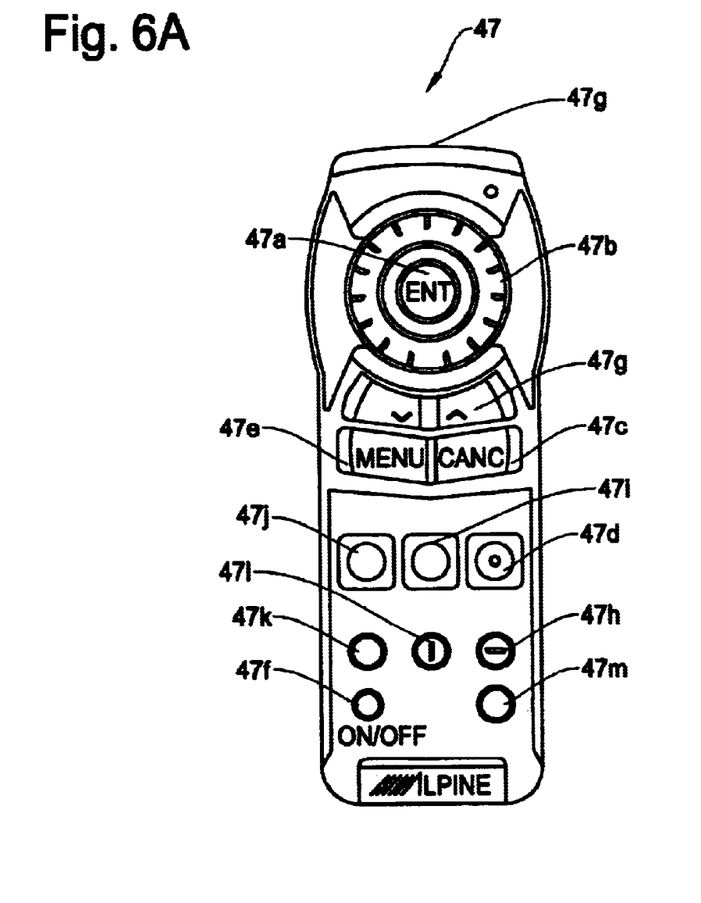
FIGS. 6A and 6B are diagrams showing an example of a remote controller accompanied by the vehicle navigation system of the present invention.
Figure 6B:
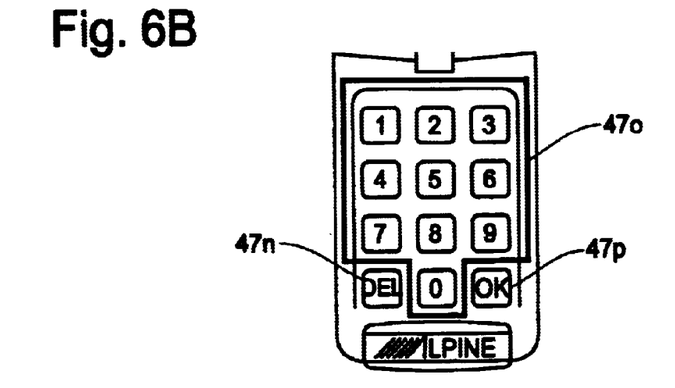

The remote controller 47 has a variety of function keys as shown in FIG. 6A and numeric keys as shown in FIG. 6B. The numeric keys appear when a lid in the lower part of FIG. 4A is opened. The remote controller 47 includes a joystick/enter key 47a, a rotary encoder 47b, a cancel key 47c, an MP/RG key 47d, a menu key 47e, a zoom/scroll key 47q, a monitor ON/OFF key 47f, a remote control transmitter 47g, a plan key 47h, an N/H key 47i, a voice key 47j, a list key 47k, a detour key 47l, a delete destination key 47m, a delete key 47n, numeric keys 47o, and an OK key 47p.

The joystick/enter key 47a selects highlighted items within the menu and moves map displays and a vehicle position icon. The rotary encoder 47b changes zoom scale, scrolls list pages, moves the cursor, and etc. The cancel key 47c cancels the present displayed screen or is operated when returning the screen to the previous menu screen. The MP/RG key 47d toggles between detailed map display and basic guide display during guidance. The menu key 47e displays the main menu. The plan key 47h starts the guidance to the route set by Today's Plan function, the N/H key 47i changes between North-up and Heading-up orientation, and the voice key 47j initiates voice instruction.

Although a remote controller such as described above is a typical example for selecting menus, executing selected functions and etc., the navigation system includes various other input methods to achieve the same and similar operations done through the remote controller. For example, a navigation system may include hard keys and joystick on a head unit of the system mounted on a dash board, touch screen, and voice communication.

Referring back to FIG. 5, the navigation system further includes a bus 46 for interfacing the above units in the system, a processor (CPU) 49 for controlling an overall operation of the navigation system, a ROM 50 for storing various control programs such as a route search program and a map matching program necessary for navigation control, a RAM 51 for storing a processing result such as a guide route, a voice guiding unit 52 for guiding a traveling direction at a crossroad with spoken instructions, a display controller 53 for generating map images (a map guide image and an arrow guide image) on the basis of the map information, a VRAM 54 for storing the images generated by the display controller, a menu/list generating unit 55 for generating menu image/various list images, a synthesizing unit 56 for synthesizing images from the VRAM 54 and the menu/list generating unit 55, a monitor (display) 57, a voice interface 58 for voice communication between the user and system, and a key and screen interface 59 for interfacing with various other input means such as hard keys and joystick on a panel of the system or a touch screen of the system, and the like.

As described in the following with reference to FIGS. 7–12, in the present invention, the navigation system applies various test conditions and determines a number of turns (maneuver points) to be displayed and enlarges the size of the guidance map. When driving a city, for example, there arises a situation where a vehicle has to make many turns within a relatively small area on the route to the destination. If the navigation system shows all of such turns on the guidance map, an image of the upcoming turn on the screen may be too small for a driver to fully prepare the turn. If the navigation system shows only first one or two turns, the driver may not be able to grasp the subsequent turning conditions at a glance.

The navigation system of the present invention adjusts the number of turns to be displayed and maximizes the guidance map image. The guidance map includes a highlighted route indicating the directions of turns. To determine the number of turns, the navigation system applies various test conditions to the geometry of the streets. Then, the navigation system enlarges the map so that the map covers the area having the height and the width that are sufficiently large relative to the adjusted number of turns (maneuver points) and the streets fit within the mapped area.

In the present invention, the enlarged map should include the area around the series of maneuvers that satisfy some or all of the following test conditions:

$$L_{(n,\ n+1)} \leq L_{max} \qquad \text{Test condition (1)}$$

where $L_{(n,\ n+1)}$ is a drive length along the street between two adjacent maneuver points $P_n$ and $P_{n+1}$, and $L_{max}$ is a maximum allowable drive length of the street between the two adjacent maneuver points. An example of $L_{max}$ is 200–300 meters. The test condition (1) is to include a street on the guidance map screen whose length between the two maneuver points is shorter than the predetermined maximum length ($L_{max}$), such as 200 meters. In other words, the last maneuver point $P_{n+1}$ forming the street which is longer than 200 meters is removed from the guidance map display.

$$L_{(n,\ n+1)} \leq K_D D_{(1,\ 2)} \qquad \text{Test condition (2)}$$

where $L_{(n,\ n+1)}$ is a drive length along the street between two adjacent maneuver points $P_n$ and $P_{n+1}$, $D_{(1,\ 2)}$ is a straight-line length between the first maneuver point $P_1$ and second maneuver point $P_2$, and $K_D$ is a relative factor (coefficient) for determining the maximum allowable straight-line maneuvers. An example of the coefficient $K_D$ is 3–5. The test condition (2) is to include a street in the guidance map screen whose length between the two maneuver points is shorter than a predetermined coefficient or ratio ($K_D$), such as three times, of the straight-line length between the first turn and the second turn. In other words, the last maneuver point of the street which is three times longer than the first street (between first and second maneuver points) is removed from the guidance map display.

It should be noted that this test condition can be modified to $D_{(n,\ n+1)} \leq K_{DD} D_{(1,\ 2)}$ where $K_{DD}$ is a relative factor (coefficient) equivalent to $K_D$ above but is applicable to the straight-line length between points $P_n$ and $P_{n+1}$ instead of the drive length between the two maneuver points. This modified test condition is to include a street in the guidance map screen whose straight length between the two maneuver points is shorter than a predetermined factor ($K_{DD}$), such as three times, of the straight-line length between the first turn and the second turn.

$$L_{(n,\ n+1)} \leq K_{LD} D_{(n,\ n+1)} \qquad \text{Test condition 3}$$

where $L_{(n,\ n+1)}$ is a drive length along the street between two adjacent maneuver points $P_n$ and $P_{n+1}$, $D_{(n,\ n+1)}$ is a straight-line length between the two adjacent maneuver points $P_n$ and $P_{n+1}$, and $K_{LD}$ is a relative factor for determining the maximum drive length with respect to the straight-line distance. An example of $K_{LD}$ is 1.5–2. The test condition (3) is to include a street in the guidance map screen whose drive length between the two maneuver points is shorter than a predetermined time, such as two times, of the straight-line length between the same two maneuver points. In other words, the last maneuver point $P_{n+1}$ of the two maneuver points forming the street whose length along the street is two times longer than the straight-line length between the same two maneuver points is removed from the guidance map display.

$$D_{(1, n+1)} \leq D_{max} \qquad \text{Test condition 4}$$

where $D_{(1, n+1)}$ is a straight-line distance between the first maneuver point $P_1$ and the farthest maneuver point $P_{n+1}$, and $D_{max}$ is a maximum allowable distance between the upcoming maneuver point and farthest maneuver point. An example of $D_{max}$ is 1,000 meters. The test condition (4) is to include a street having the farthest maneuver point in the guidance map screen where a straight-line distance between the first maneuver point and the farthest maneuver point is smaller than the predetermined maximum distance $D_{max}$. In other words, the farthest maneuver point $P_{n+1}$ which is more than $D_{max}$ apart from the first maneuver point in the straight-line distance is removed from the guidance map display.

$$m \leq M_{max} \qquad \text{Test condition 5}$$

where m is a number of maneuvers in succession which is three or larger, and $M_{max}$ is a maximum allowable number of maneuvers that can simultaneously appear on the same screen. An example of $M_{max}$ is 4–5. The test condition (5) is to include a number of maneuver points less than the predetermined maximum number ($M_{max}$) such as four. In other words, the fifth or higher maneuver points will be removed from the guidance map display.

Figure 7:
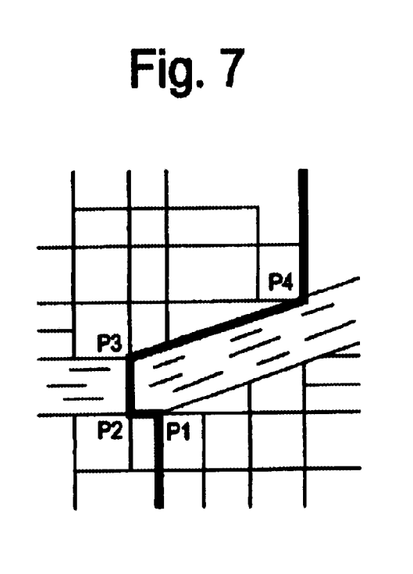
FIG. 7 is a diagram showing an example of route to the destination for explaining the effect of the navigation system of the present invention.
Figure 8:
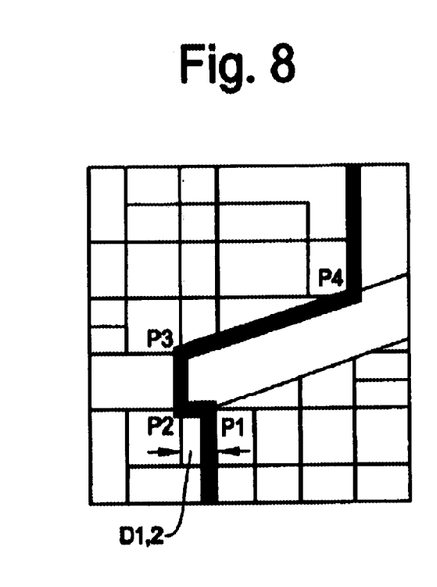
FIG. 8 is a diagram showing a display example of route guidance map by the navigation system of the present invention for the route map of FIG. 7 based on the test condition (1).
Figure 9:
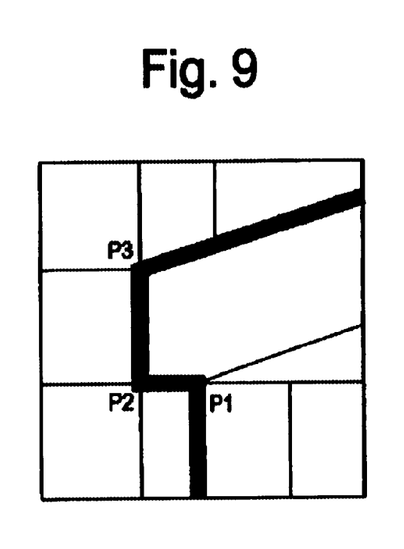
FIG. 9 is a diagram showing another display example of route guidance map by the navigation system of the present invention for the route map of FIG. 7 based on the test conditions (1) and (2).

FIGS. 7–9 are schematic diagrams explaining the effects of the test conditions (1) and (2). In this example, as shown in FIG. 7, the route to the destination includes several turns within a relatively small area. Such a series of turns are denoted by maneuver points $P_1$–$P_4$. In this example, a street between the maneuver points $P_1$ and $P_2$ is the shortest and a street between the maneuver points $P_3$ and $P_4$ is the longest. After the first turn at the maneuver point $P_1$, there are immediate turns across the river at maneuver points $P_2$ and $P_3$.

Suppose the longest street between the maneuver points $P_3$ and $P_4$ is shorter than $L_{max}$, such as 200 meters, when applying only the test condition (1), the navigation system displays a guidance map such as shown in FIG. 8. The highlighted route on the guidance map tells the driver about the positions and directions of the maneuver points. However, suppose the street between the maneuver points $P_1$ and $P_2$ is very short, such as 30 meters, the guidance map of FIG. 8 is not large enough for the driver to fully prepare for the second maneuver point $P_2$. Because the first turn and the second turn are displayed with such a small size, it is difficult for the driver to grasp the situation at a glance and prepare for the subsequent turn, for example, change the lane for the second maneuver point $P_2$.

FIG. 9 shows an example of guidance map displayed by the navigation system of the present invention when applying the test condition (2) to the situation in FIG. 8. As noted above, in the test condition (2), it is tested whether the drive length $L_{(3, 4)}$ is smaller than $K_D$, for example, four times of the straight-line length $D_{(1, 2)}$. In FIG. 8, suppose the length $L_{(3, 4)}$ of the street between the maneuver points $P_3$ and $P_4$ is longer than four times of the straight-line length $D_{(1, 2)}$ between the maneuver points $P_1$ and $P_2$, the maneuver point $P_4$ is removed from the display by the test condition (2). Thus, the navigation system is able to provide an enlarged view of the route including the maneuver points $P_1$–$P_3$ but not the maneuver point $P_4$ in the manner shown in FIG. 9. An example of enlargement is to maximize the size of the guidance map while including all of the adjusted number of maneuver points.

Figure 10A:
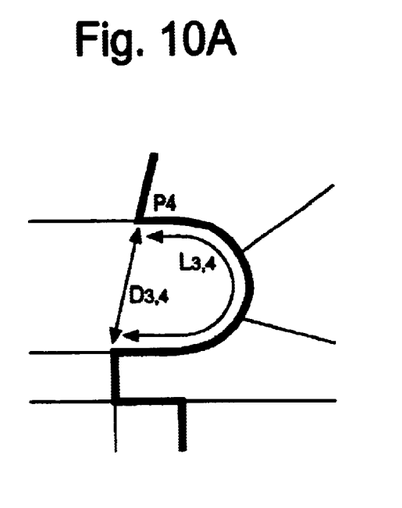
FIG. 10A is a schematic diagram showing an example of route map to the destination and FIG. 10B is a display example of route guidance map by the navigation system of the present invention for the route map of FIG. 10A based on the test condition (3).
Figure 10B:
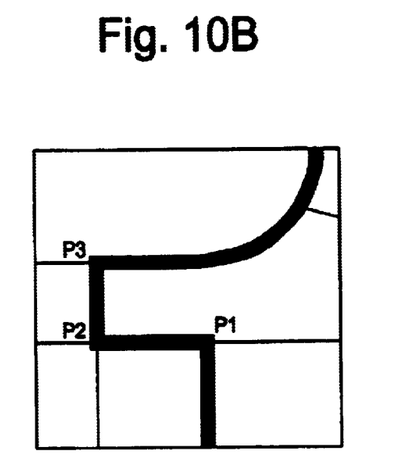

FIGS. 10A and 10B are schematic diagram explaining the effects of the test condition (3) of the present invention. In this example, the route to the destination includes a curved street between the maneuver points $P_3$ and $P_4$ as shown in FIG. 10A. It is assumed that a drive length along the street between the maneuver points $P_3$ and $P_4$ is shorter than $L_{max}$ (ex. 200 m) in the test condition (1) and less than four times of the straight-line length between the maneuver points $P_1$ and $P_2$ in the test condition (2). Then, the navigation system will show the guidance map substantially the same size as shown in FIG. 10A, which may be too small and complicated for the driver to fully prepare for the subsequent turns.

In the test condition (3), the navigation system evaluates the relationship $L_{(3, 4)} \leq K_{LD} D_{(3, 4)}$. Namely, it is tested whether the drive length $L_{(3, 4)}$ along the street between the maneuver points $P_3$ and $P_4$ is shorter than $K_{LD}$ times of the straight-line distance $D_{(3, 4)}$ between the same maneuver points $P_3$ and $P_4$. As noted above, $K_{LD}$ is a relative factor which is, for example, 1.5.

Suppose the drive length $L_{(3, 4)}$ is longer than the straight-line distance $D_{(3, 4)}$ by more than 1.5 times, under the test condition (3), the navigation system removes the maneuver point $P_4$ from the display. Consequently, the navigation system is able to provide an enlarged view of the route including the first, second and third turns in the manner shown in FIG. 10B. Thus, the driver is able to see the complicated branch points with a sufficiently large display size, such as a maximum available size, thereby enabling to fully prepare for the subsequent turns.

Figure 11A:
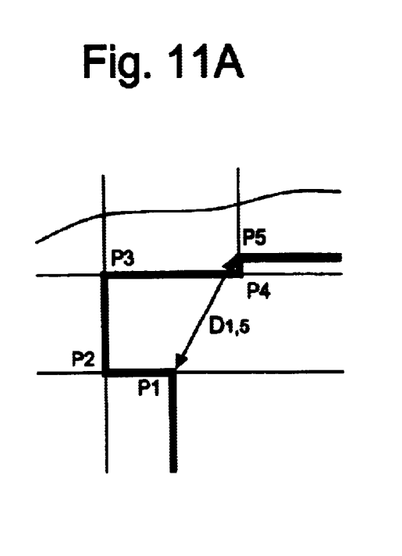
FIG. 11A is a schematic diagram showing an example of route map to the destination and FIG. 11B is a display example of guidance map by the navigation system of the present invention for the route map of FIG. 11A based on the test condition (4).

FIGS. 11A–11D are schematic diagrams explaining the effects of the test condition (4) of the present invention. In the case where the farthest maneuver point is within a relatively short straight-line distance from the first maneuver point, an overall guidance map which includes the farthest maneuver point can be made sufficiently large. In the example of route to the destination such as shown in FIG. 11A, the farthest maneuver point $P_5$ does not seem too far from the first maneuver point $P_1$ because of the specific geometry of the route.

Figure 11B:
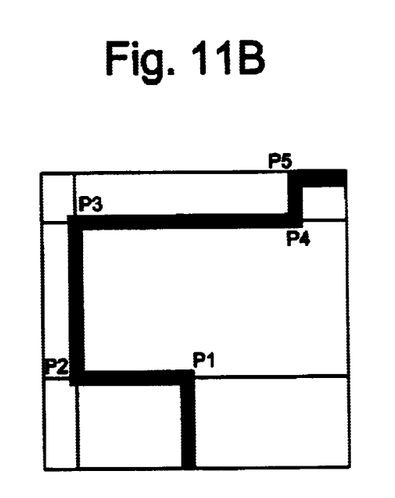

In the test condition (4), the navigation system evaluates the relationship $D_{(1, 5)} \leq D_{max}$. In this test, it is determined whether the straight-line distance between the first point $P_1$ and the farthest maneuver point $P_5$ is shorter than the predetermined maximum length $D_{max}$ which is for example, 1,000 meters. Suppose the straight-line distance $D_{(1, 5)}$ is shorter than $D_{max}$, the navigation system includes the maneuver point $P_5$ in the guidance map as shown in FIG. 11B. Since the maneuver point $P_1$ is within a relatively short distance from the first maneuver point $P_1$, the navigation system is able to provide an enlarged view of the route including the first to fifth turns simultaneously in the guidance map. Thus, the driver is able to grasp the overall situation of the turns on the route at a glance and prepare for the subsequent turns.

Figure 11C:
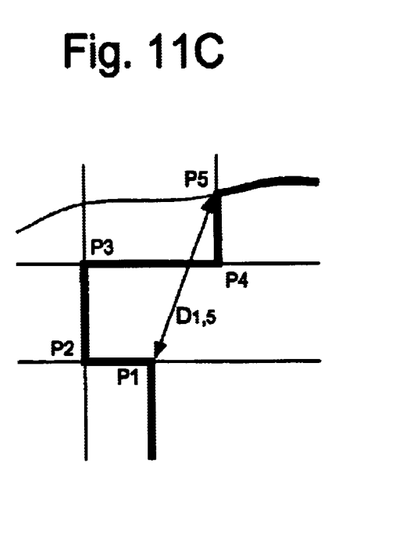
FIG. 11C is a schematic diagram showing another example of route map and FIG. 11D is a display example of route guidance map by the navigation system for the route map of FIG. 11C based on the test condition (4).

In contrast, in the example of FIG. 11C, the farthest maneuver point $P_5$ is positioned further upward (ex. North) compared to the example of FIG. 11A. Suppose, in FIG.

Figure 11D:
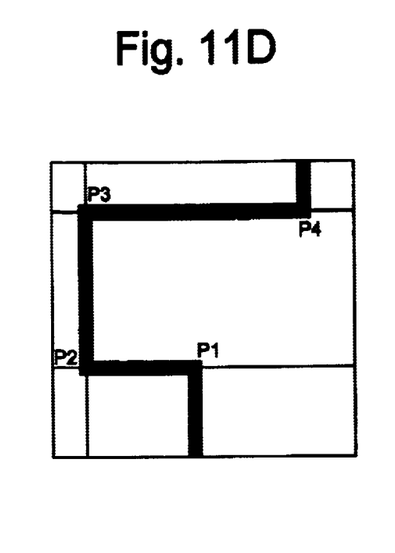

11C, the straight-line distance $D_{(1, 5)}$ between the first maneuver point $P_1$ and the farthest maneuver point $P_5$ is longer than $D_{max}$, the navigation system excludes the maneuver point $P_5$ from the guidance map as shown in FIG. 11D. Since the maneuver point $P_5$ is not included in the guidance map, the navigation system is able to provide an enlarged view of the area including the first to fourth turns simultaneously in the guidance map. Thus, the driver is able to grasp the overall situation at a glance and prepare for the subsequent turns.

Figure 12A:
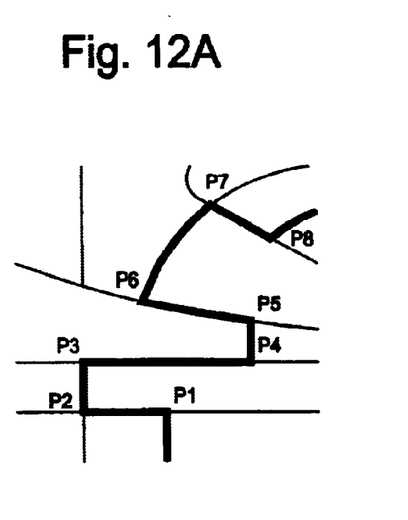
FIG. 12A is a schematic diagram showing an example of route map to the destination and FIG. 12B is a display example of route guidance map by the navigation system of the present invention for the route map of FIG. 12A based on the test condition (5).
Figure 12B:
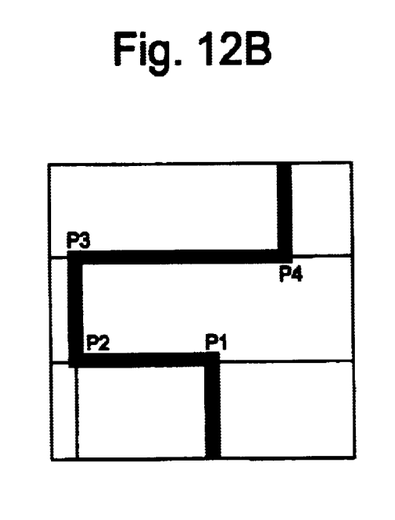

FIGS. 12A and 12B are schematic diagrams explaining the effects of the test condition (5) of the present invention. In the case where many turns are involved in the route to the destination within a relatively small area, the navigation system has to display such many turns on the guidance map. However, illustrations of too many turns on the guidance map may confuse the driver or make the driver difficult to grasp the situation.

Such an example is shown in FIG. 12A where the route to the destination includes zig-zag like paths. Even when all of the maneuver points $P_1$–$P_8$ satisfy the foregoing test conditions (1)–(4), to display all of the maneuver points $P_1$–$P_8$ on the guidance map may not be beneficial to the driver because it gives a complicated impression. Further, in an actual use, to fully prepare for the subsequent turns, it is unnecessary to show branch points coming after several preceding turns.

Therefore, the test condition (5) is to limit the number of maneuver points to be displayed on the guidance map even though such maneuver points are within the small area. In the test condition (5), the navigation system evaluates whether the number m of maneuvers in succession is smaller than the maximum allowable number $M_{max}$, such as four. Therefore, the maneuver points $P_5$–$P_8$ are removed from the display in the manner shown in FIG. 12B. The navigation system provides an enlarged view of the area including the first to fourth turns simultaneously in the guidance map in FIG. 12B. Thus, the driver is able to obtain sufficient information about the route situation at a glance and prepare for the subsequent turns.

In the navigation system of the present invention, it is not necessary to use all of the test conditions described above although the best result will be obtained when using all of the test conditions. In many practical cases, even the combination of the test conditions (1) and (2) alone will attain a substantially satisfactory result. However, the test condition (1) alone may not be sufficient for many cases. Further, as noted above, the order of application of the test conditions is insignificant.

Judgement as to which test condition or conditions should be used can be made automatically by the navigation system based on initial settings by a user. For example, the navigation system can be so designed that a user can select a performance level such as "normal", "high" or "highest". In the normal performance level, the navigation system is designed to conduct only the test condition (1) or a combination of the test conditions (1) and (2). In the high performance level, the navigation is designed to additionally conduct the test condition (3). In the highest performance level, the navigation system further conducts the test condition (4) or (5).

FIGS. 13 and 14 show examples of operation in the navigating system of the present invention. The operation in the flow chart of FIG. 13 utilizes the test conditions (1)–(3) and (5) while the operation in the flow chart of FIG. 14 utilizes the test conditions (1)–(2) and (4)–(5). It should be noted that various combinations will be possible in the present invention, and the operations in the flow charts of FIGS. 13 and 14 are shown only for illustration purposes.

In the example of FIG. 13, at step 101, the navigation system detects successive turns on the route to the destination and applies the test condition (1) noted above, i.e., $L_{(n, n+1)} \leq L_{max}$. The navigation system collects a series of maneuver points on the route where a distance between two adjacent maneuver points is less than $L_{max}$, for example, 200 meters. At step 102, the system determines whether the test condition (2) should apply to the results. When the test condition (2) is not used, the navigation system enlarges the guidance map and displays the maximized guidance map at step 103.

When it is determined to apply the test condition (2), at step 104, the navigation system tests whether the relationship $L_{(n, n+1)} \leq K_D D_{(1, 2)}$ exists. If a particular street distance $L_{(n, n+1)}$ is greater than $K_D$ times of the straight-line distance $D_{(1, 2)}$ between the first and second maneuver points, the navigation system removes the maneuver point $P_{n+1}$ from the guidance map. As noted above, this test condition can be modified to $D_{(n, n+1)} \leq K_{DD} D_{(1, 2)}$, where $K_{DD}$ is a relative factor applicable to the straight line distance $D_{(n, n+1)}$ between the points $P_n$ and $P_{1+1}$ instead of the drive length between the two maneuver points. At step 105, the navigation system determines whether the test condition (3) should apply. When the test condition (3) is not used, the navigation system enlarges the guidance map and displays the maximized guidance map at step 106.

When it is determined to apply the test condition (3), at step 107, the navigation system tests whether the relationship $L_{(n, n+1)} \leq K_{LD} D_{(n, n+1)}$ exists. If a particular street distance $L_{(n, n+1)}$ is greater than $K_{LD}$ times of the straight-line distance $D_{(n, n+1)}$ between the same maneuver points, the navigation system removes the maneuver point $P_{n+1}$ from the guidance map. At step 108, the navigation system determines whether the test condition (5) should apply. When the test condition (5) is not used, the navigation system enlarges the guidance map and displays the maximized guidance map at step 109.

When it is determined to apply the test condition (5), at step 110, the navigation system tests whether the number of maneuver points exceeds the predetermined maximum number $M_{max}$. The navigation system removes the later coming maneuver points which exceed the predetermined maximum number. Then, the navigation system enlarges the guidance map and displays the maximized guidance map at step 111 and process ends.

In the example of FIG. 14, at step 201, the navigation system detects successive turns on the route to the destination and applies the test condition (1) noted above, i.e., $L_{(n, n+1)} \leq L_{max}$. The navigation system collects a series of maneuver points on the route where a distance between two adjacent maneuver points is less than $L_{max}$, for example, 200 meters. At step 202, the system determines whether the test condition (2) should apply to the results. When the test condition (2) is not used, the navigation system enlarges the guidance map and displays the maximized guidance map at step 203.

When it is determined to apply the test condition (2), at step 204, the navigation system tests whether the relationship $L_{(n, n+1)} \leq K_D D_{(1, 2)}$ exists. If a particular street distance $L_{(n, n+1)}$ is greater than $K_D$ times of the straight-line distance $D_{(1, 2)}$ between the first and second maneuver points, the navigation system removes the maneuver point $P_{n+}$ from the guidance map. As noted above, this test condition can be modified to $D_{(n, n+1)} \leq K_{DD} D_{(1, 2)}$ where $K_{DD}$ is a relative factor applicable to the straight line distance $D_{(n, n+1)}$ between the points $P_n$ and $P_{n+1}$ instead of the drive length between the two maneuver points. At step 205, the navigation system determines whether the test condition (4) should apply. When the test condition (4) is not used, the navigation system enlarges the guidance map and displays the maximized guidance map at step 206.

When it is determined to apply the test condition (4), at step 207, the navigation system tests whether the relationship $D_{(1, n+1)} \leq D_{max}$ exists. If a straight-line distance between the first maneuver point and the farthest maneuver point is greater than the predetermined maximum distance $D_{max}$, the navigation system removes the farthest maneuver point $P_{n+1}$ from the guidance map. At step 208, the navigation system determines whether the test condition (5) should apply. When the test condition (5) is not used, the navigation system enlarges the guidance map and displays the maximized guidance map at step 209.

When it is determined to apply the test condition (5), at step 210, the navigation system tests whether the number of maneuver points exceeds the predetermined maximum number $M_{max}$. The navigation system removes the later coming maneuver points which exceed the predetermined maximum number. Then, the navigation system enlarges the guidance map and displays the maximized guidance map at step 211 and process ends.

As has been described above, according to the present invention, the vehicle navigation system enables the user to easily grasp the consecutive turns and the their directions on the route to the destination. The driver can attain the image of the maneuver points at a glance and fully prepare for the next turn such as by changing the lane. Accordingly, the driver can travel to the destination comfortably and with confidence.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method for a navigation system, comprising the following steps of:

displaying a guidance map for guiding a user to a destination by indicating a maneuver point on the route and a direction of turn at the maneuver point;

detecting a plurality of maneuver points in succession on the route to the destination and applying a test condition to the maneuver points based on geometry of the maneuver points;

adjusting a number of maneuver points to be displayed on the guidance map as a result of applying the test condition to the maneuver points; and enlarging a size of the guidance map while including the adjusted number of maneuver points in the guidance map;

wherein said test condition includes a test condition (1) which determines $L_{(n, n+1)} \leq L_{max}$, where $L_{(n, n+1)}$ is a drive length along a street between two adjacent maneuver points $P_n$ and $P_{n+1}$, and $L_{max}$ is a maximum allowable drive length of the a street between the two adjacent maneuver points and a test condition (2) which determines $L_{(n, n+1)} \leq K_D D_{(1, 2)}$, where $D_{(1, 2)}$ is a straight-line length between a first maneuver point $P_1$ and a second maneuver point $P_2$, and $K_n$ is a relative factor for determining maximum allowable straight-line maneuvers.

2. A display method for a navigation system as defined in claim 1, wherein said step of enlarging said guidance map including a step of maximizing the size of the guidance map while including all of the adjusted number of maneuver points.

3. A display method for a navigation system as defined in claim 1, said test condition (2) is modified so that the test condition (2) determines $D_{(n, n+1)} \leq K_{DD} D_{(1, 2)}$, where $D_{(n, n+1)}$ is a straight-line length between two adjacent maneuver points $P_n$ and $P_{n+1}$, and $K_{DD}$ is a relative factor for determining maximum allowable straight-line maneuvers.

4. A display method for a navigation system as defined in claim 3, said $K_{DD}$ is about 3–5.

5. A display method for a navigation system as defined in claim 1, said test condition includes a test condition (3) which determines $L_{(n, n+1)} \leq K_{LD} D_{(n, n+1)}$, where $D_{(n, n+1)}$ is a straight-line length between the two adjacent maneuver points $P_n$ and $P_{n+1}$, and $K_{LD}$ is a relative factor for determining a maximum drive length with respect to the straight-line distance.

6. A display method for a navigation system as defined in claim 5, said $K_{LD}$ is about 1.5–2.

7. A display method for a navigation system as defined in claim 1, said test condition includes a test condition (4) which determines $D_{(1, n+1)} \leq D_{max}$, where $D_{(1, n+1)}$ is a straight-line distance between a first maneuver point $P_1$ and a farthest maneuver point $P_{n+1}$, and $D_{max}$ is a maximum allowable distance between the first maneuver point $P_1$ and the farthest maneuver point $P_{n+1}$.

8. A display method for a navigation system as defined in claim 1, said test condition includes a test condition (5) which determines $m \leq M_{max}$, where m is a number of maneuvers in succession, and $M_{max}$ is a maximum allowable number of maneuver points that can simultaneously appear on guidance map.

9. A display method for a navigation system as defined in claim 8, said $M_{max}$ is about 4–5.

10. A display method for a navigation system as defined in claim 1, said $L_{max}$ is about 200–300 meters.

11. A display method for a navigation system as defined in claim 1, said $K_D$ is about 3–5.

12. A display apparatus for a navigation system, comprising:

means for displaying a guidance map for guiding a user to a destination by indicating a maneuver point on the route and a direction of turn at the maneuver point;

means for detecting a plurality of maneuver points in succession on the route to the destination and applying a test condition to the maneuver points based on geometry of the maneuver points;

means for adjusting a number of maneuver points to be displayed on the guidance map as a result of applying the test condition to the maneuver points; and means for enlarging a size of the guidance map while including the adjusted number of maneuver points in the guidance map;

wherein said test condition includes a test condition (1) which determines $L_{(n, n+1)} \leq L_{max}$, where $L_{(n, n+1)}$ is a drive length along a street between two adjacent maneuver points $P_n$ and $P_{n+1}$, and $L_{max}$ is a maximum allowable drive length of the a street between the two adjacent maneuver points and a test condition (2) which determines $L_{(n, n+1)} \leq K_D D_{(1, 2)}$, where $D_{(1, 2)}$ is a straight-line length between a first maneuver point $P_1$ and a second maneuver point $P_2$, and $K_D$ is a relative factor for determining maximum allowable straight-line maneuvers.

13. A display apparatus for a navigation system as defined in claim 12, wherein said means for enlarging said guidance map maximizes the size of the guidance map while including all of the adjusted number of maneuver points.

14. A display apparatus for a navigation system as defined in claim 12, said test condition (2) is modified so that the test condition (2) determines $D_{(n, n+1)} \leq K_{DD} D_{(1, 2)}$, where $D_{(n, n+1)}$ is a straight-line length between two adjacent maneuver points $P_n$ and $P_{n+1}$, and $K_{DD}$ is a relative factor for determining maximum allowable straight-line maneuvers.

15. A display apparatus for a navigation system as defined in claim 14, said $K_{DD}$ is about 3–5.

16. A display apparatus for a navigation system as defined in claim 12, said test condition includes a test condition (3) which determines $L_{(n, n+1)} \leq K_{LD} D_{(n, n+1)}$, where $D_{(n, n+1)}$ is a straight-line length between the two adjacent maneuver points $P_n$ and $P_{n+1}$, and $K_{LD}$ is a relative factor for determining a maximum drive length with respect to the straight-line distance.

17. A display apparatus for a navigation system as defined in claim 16, said $K_{LD}$ is about 1.5–2.

18. A display apparatus for a navigation system as defined in claim 12, said test condition includes a test condition (4) which determines $D_{(1, n+1)} \leq D_{max}$, where $D_{(1, n+1)}$ is a straight-line distance between a first maneuver point $P_1$ and a farthest maneuver point $P_{n+1}$, and $D_{max}$ is a maximum allowable distance between the first maneuver point $P_1$ and the farthest maneuver point $P_{n+1}$.

19. A display apparatus for a navigation system as defined in claim 12, said test condition includes a test condition (5) which determines $m \leq M_{max}$, where m is a number of maneuvers in succession, and $M_{max}$ is a maximum allowable number of maneuver points that can simultaneously appear on guidance map.

20. A display apparatus for a navigation system as defined in claim 19, said $M_{max}$ is about 4–5.

21. A display apparatus for a navigation system as defined in claim 12, said $L_{max}$ is about 200–300 meters.

22. A display apparatus for a navigation system as defined in claim 12, said $K_D$ is about 3–5.

* * * * *